United States Patent
Yeon et al.

(10) Patent No.: US 11,479,130 B2
(45) Date of Patent: Oct. 25, 2022

(54) FUEL CELL VEHICLE

(71) Applicants: Hyundai Motor Company, Seoul (KR); Kia Motors Corporation, Seoul (KR)

(72) Inventors: Seung Jun Yeon, Yongin-si (KR); Myung Kwang Jin, Bucheon-si (KR); Nam Chul Jung, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 37 days.

(21) Appl. No.: 16/850,592

(22) Filed: Apr. 16, 2020

(65) Prior Publication Data

US 2021/0138914 A1    May 13, 2021

(30) Foreign Application Priority Data

Nov. 12, 2019 (KR) .................. 10-2019-0144312

(51) Int. Cl.
  *B60K 1/04* (2019.01)
  *B60L 50/70* (2019.01)

(52) U.S. Cl.
  CPC .............. *B60L 50/70* (2019.02); *B60K 1/04* (2013.01); *B60K 2001/0411* (2013.01); *B60K 2001/0416* (2013.01); *B60L 2200/36* (2013.01)

(58) Field of Classification Search
  CPC ....... B60L 50/70; B60L 2200/36; B60K 1/04; B60K 2001/0411; B60K 2001/0416
  See application file for complete search history.

(56) References Cited

U.S. PATENT DOCUMENTS

| | | | |
|---|---|---|---|
| 2003/0070858 A1* | 4/2003 | Kondo | B60L 50/71 180/291 |
| 2003/0178422 A1 | 9/2003 | Kosuge et al. | |
| 2003/0189334 A1* | 10/2003 | Kawasaki | B60K 1/04 280/834 |
| 2009/0261107 A1 | 10/2009 | Allgeier et al. | |
| 2019/0263450 A1* | 8/2019 | Inoue | B62D 21/152 |

FOREIGN PATENT DOCUMENTS

| | | |
|---|---|---|
| CN | 206394459 U | 8/2017 |
| CN | 107161016 A | 9/2017 |
| CN | 108099677 A | 6/2018 |
| DE | 202012004613 U1 | 7/2013 |
| DE | 102014017300 A1 | 6/2015 |
| JP | 2017128202 A | 7/2017 |

OTHER PUBLICATIONS

European Patent Office, European Search Report issued in EP 20171051, dated Sep. 29, 2020, 8 pages.

* cited by examiner

*Primary Examiner* — James A English
*Assistant Examiner* — James J Triggs
(74) *Attorney, Agent, or Firm* — Slater Matsil, LLP

(57) ABSTRACT

A fuel cell vehicle is disclosed. The fuel cell vehicle includes a front fuel cell mounted in a first space and a rear fuel cell mounted in a second space located at the rear side of the first space on the basis of the direction in which the fuel cell vehicle travels. The rear fuel cell includes a top surface lower than the top surface of the front fuel cell on the basis of the ground.

20 Claims, 8 Drawing Sheets

FUEL CELL VEHICLE

CROSS-REFERENCE TO RELATED APPLICATIONS

This application claims priority to Korean Patent Application No. 10-2019-0144312, filed on Nov. 12, 2019, which application is hereby incorporated herein by reference.

TECHNICAL FIELD

Embodiments relate to a vehicle including a fuel cell.

BACKGROUND

Because commercial vehicles such as trucks and buses are heavier and larger than automobiles, a relatively large amount of output, e.g., about 200 kW or more, is required in order to drive commercial vehicles. Thus, it may be impossible or difficult to drive a commercial vehicle using only one fuel cell of the type used in automobiles. Therefore, research thereon is being actively conducted.

SUMMARY

Accordingly, embodiments are directed to a fuel cell vehicle that can substantially obviate one or more problems due to limitations and disadvantages of the related art.

Embodiments provide a fuel cell vehicle in which a plurality of fuel cells is efficiently mounted.

In one embodiment, a fuel cell vehicle may include a front fuel cell mounted in a first space and a rear fuel cell mounted in a second space located at the rear side of the first space on the basis of the direction in which the fuel cell vehicle travels. The rear fuel cell includes a top surface lower than the top surface of the front fuel cell on the basis of the ground.

For example, the fuel cell vehicle may further include first and second body frames extending in a first direction, in which the fuel cell vehicle travels, and disposed opposite each other in a second direction intersecting the first direction, and the space between the first body frame and the second body frame, spaced apart from each other in the second direction, may include the first space and the second space.

For example, the fuel cell vehicle may further include a cab and a loading part located at the rear side of the cab, and each of the cab and the loading part may be supported by the first and second body frames.

For example, the fuel cell vehicle may further include a hydrogen storage located between the cab and the loading part in the first direction.

For example, the front fuel cell may be mounted to the lower end of the cab.

For example, the top surface of the front fuel cell may be located between the top surface of each of the first and second body frames and the bottom surface of the cab.

For example, the rear fuel cell may be mounted below the loading part.

For example, the top surface of the rear fuel cell may be lower than the bottom surface of the loading part on the basis of the ground.

For example, the rear fuel cell may be mounted below the hydrogen storage.

For example, the top surface of the rear fuel cell may be lower than the bottom surface of the hydrogen storage on the basis of the ground.

For example, the fuel cell vehicle may further include a front axle, and the front fuel cell may be disposed between the cab and the front axle.

For example, the top surface of the rear fuel cell may be lower than the top surface of the front fuel cell on the basis of the ground.

For example, the height difference between the top surface of the front fuel cell and the top surface of the rear fuel cell may be greater than the height difference between the top surface of the rear fuel cell and the bottom surface of the loading part.

For example, the height difference between the top surface of the front fuel cell and the top surface of the rear fuel cell may be greater than the height difference between the top surface of the rear fuel cell and the bottom surface of the hydrogen storage.

For example, the spacing distance in the second direction between the first body frame and the second body frame may gradually decrease from a front portion of the fuel cell vehicle to a rear portion of the fuel cell vehicle on the basis of the direction in which the fuel cell vehicle travels.

For example, the width in the second direction of the front fuel cell may be greater than the width in the second direction of the rear fuel cell, and the width in the second direction of the rear fuel cell may be less than the minimum spacing distance in the second direction between the first body frame and the second body frame.

For example, the fuel cell vehicle may further include a plurality of front connection members configured to connect the front fuel cell to the first and second body frames and a plurality of rear connection members configured to connect the rear fuel cell to the first and second body frames.

For example, the fuel cell vehicle may further include a plurality of common connection members configured to connect some of the plurality of front connection members and some of the plurality of rear connection members to the first and second body frames.

For example, the plurality of front connection members and the plurality of common connection members may connect the front fuel cell to the first and second body frames such that the front fuel cell may be mounted and demounted above the first and second body frames.

For example, the plurality of front connection members may be disposed in a region that is exposed after the cab is tilted.

For example, the plurality of rear connection members and the plurality of common connection members may connect the rear fuel cell to the first and second body frames such that the rear fuel cell may be mounted above or below the first and second body frames and may be demounted below the first and second body frames.

For example, each of the plurality of front connection members may include a first mounting support bracket connected to an end of the front fuel cell and a first individual mounting bracket configured to connect the first mounting support bracket to one of the first and second body frames.

For example, each of the plurality of front connection members may further include a first mount insulator, which is disposed between the first mounting support bracket and the first individual mounting bracket in a third direction intersecting the first and second directions and has vibration isolation capability.

For example, each of the plurality of rear connection members may include a second mounting support bracket connected to an end of the rear fuel cell and a second individual mounting bracket configured to connect the second mounting support bracket to one of the first and second body frames.

For example, each of the plurality of rear connection members may further include a second mount insulator, which is disposed between the second mounting support bracket and the second individual mounting bracket in the third direction and has vibration isolation capability.

For example, each of the plurality of common connection members may include a common mounting bracket configured to connect the first individual mounting bracket and the second individual mounting bracket, adjacent to the first individual mounting bracket in the first direction, to the first and second body frames.

For example, the first individual mounting bracket may be connected to an upper portion of the common mounting bracket, and the second individual mounting bracket may be connected to a lower portion of the common mounting bracket.

For example, the front fuel cell may include a first cell stack configured such that a plurality of unit cells is stacked in the first direction, and the rear fuel cell may include a second cell stack configured such that a plurality of unit cells is stacked in the first direction.

For example, the number of unit cells included in the first cell stack and the number of unit cells included in the second cell stack may be the same as each other.

For example, the number of unit cells included in the first cell stack and the number of unit cells included in the second cell stack may be different from each other.

BRIEF DESCRIPTION OF THE DRAWINGS

Arrangements and embodiments may be described in detail with reference to the following drawings in which like reference numerals refer to like elements and wherein.

DETAILED DESCRIPTION OF ILLUSTRATIVE EMBODIMENTS

Figure 1:
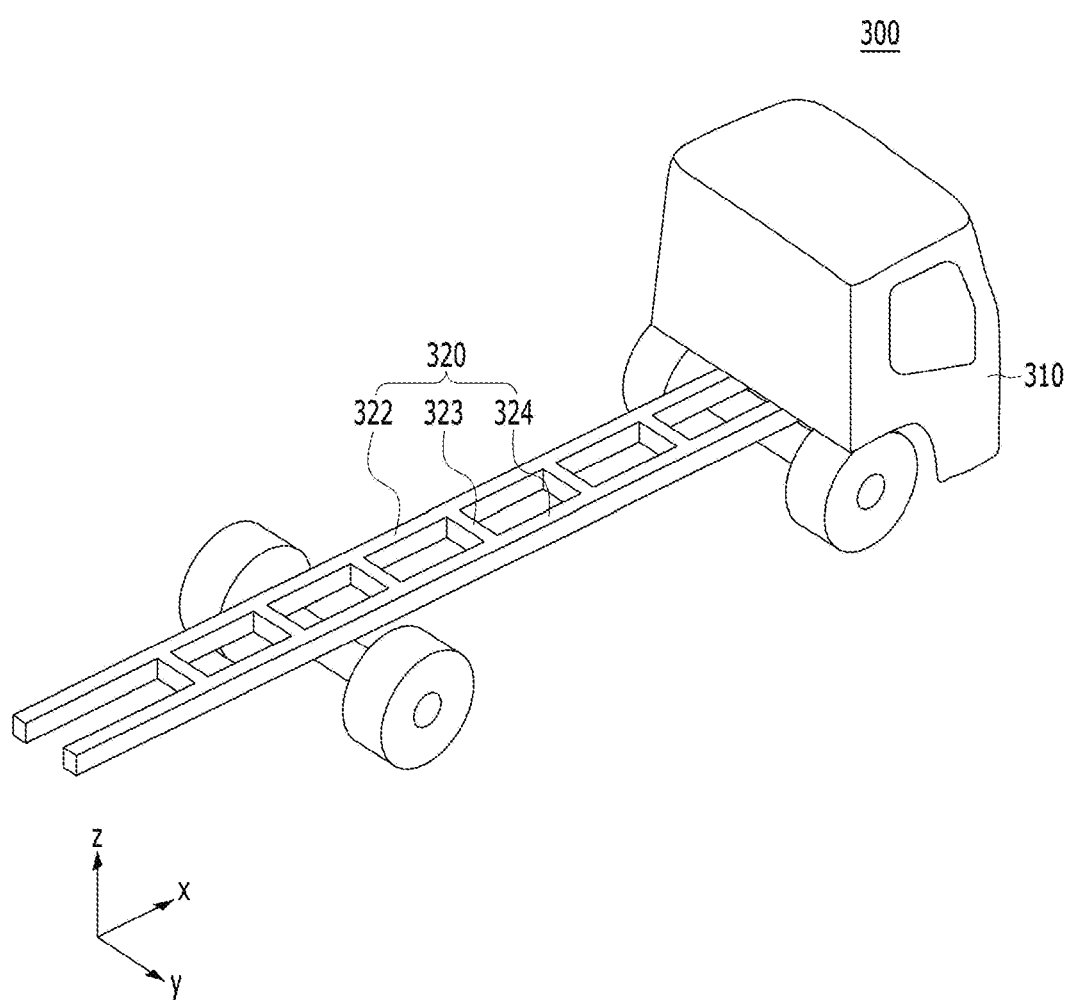
FIG. 1 is a perspective view showing the external appearance of a fuel cell vehicle according to an embodiment.

The present disclosure will now be described more fully hereinafter with reference to the accompanying drawings, in which various embodiments are shown. The examples, however, may be embodied in many different forms and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above" and "under/lower part/below", are used only to distinguish between one subject or element and another subject or element, without necessarily requiring or involving any physical or logical relationship or sequence between the subjects or elements.

Hereinafter, a fuel cell vehicle 300 (300A or 300B) according to embodiments will be described with reference to the accompanying drawings. The fuel cell vehicle 300 (300A or 300B) will be described using the Cartesian coordinate system (x-axis, y-axis, z-axis) for convenience of description. However, other different coordinate systems may be used. In the drawings, the x-axis, the y-axis, and the z-axis of the Cartesian coordinate system are perpendicular to each other. However, the disclosure is not limited thereto. That is, the x-axis, the y-axis, and the z-axis may intersect each other. In the following description, the term "first direction" refers to at least one of the +x-axis direction or the −x-axis direction, the term "second direction" refers to at least one of the +y-axis direction or −y-axis direction, and the term "third direction" refers to at least one of the +z-axis direction or the −z-axis direction. The term "downward direction (or, lower side)" may refer to the gravity direction, which is oriented toward the ground, and the term "upward direction (or, upper side)" may refer to the direction that is oriented away from the ground, i.e. the direction opposite that indicated by the term "downward direction". The term "frontward direction (or, front side)" may refer to the direction in which the vehicle 300 (300A or 300B) moves forwards, and the term "backward direction (or, rear side)" may refer to the direction in which the vehicle 300 (300A or 300B) moves backwards, i.e. the direction opposite that indicated by the term "frontward direction".

Hereinafter, a fuel cell vehicle (hereinafter, referred to as a "vehicle") 300 (300A or 300B) according to an embodiment will be described with reference to the accompanying drawings.

Figure 2:
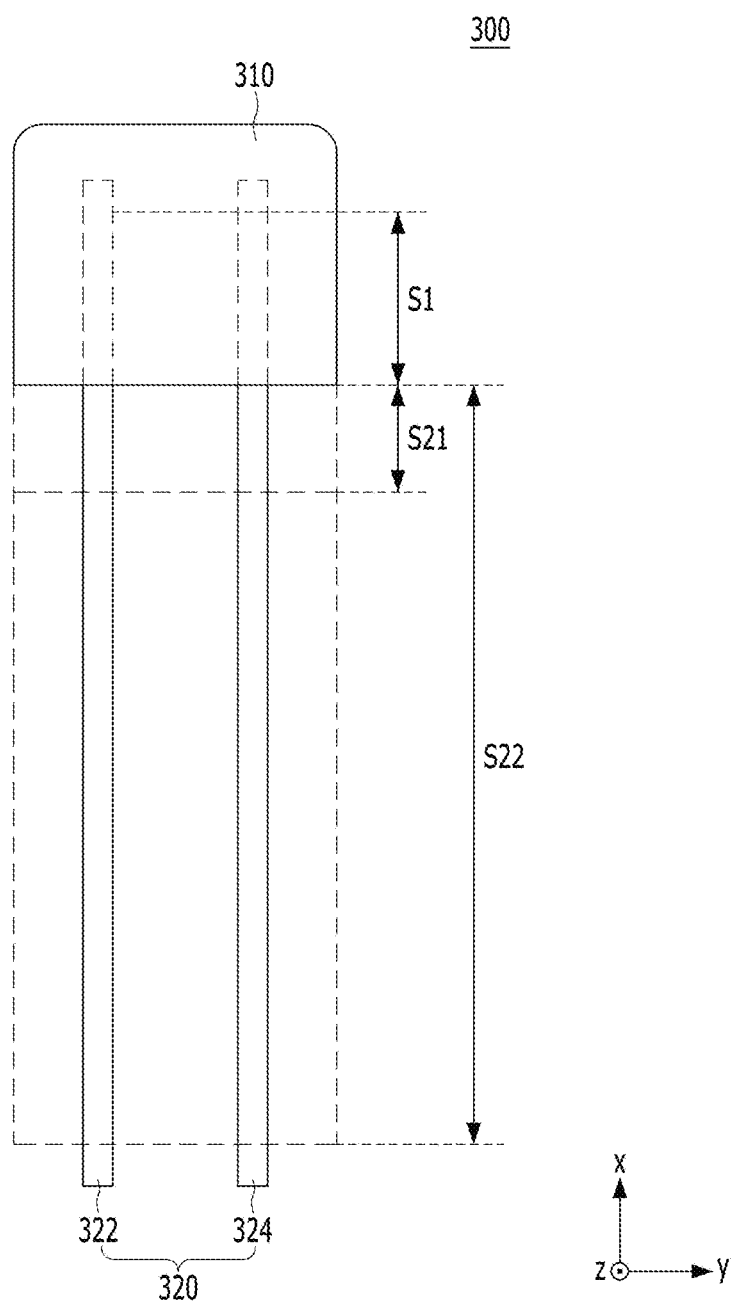
FIG. 2 is a plan view of the fuel cell vehicle shown in FIG. 1.
Figure 3A:
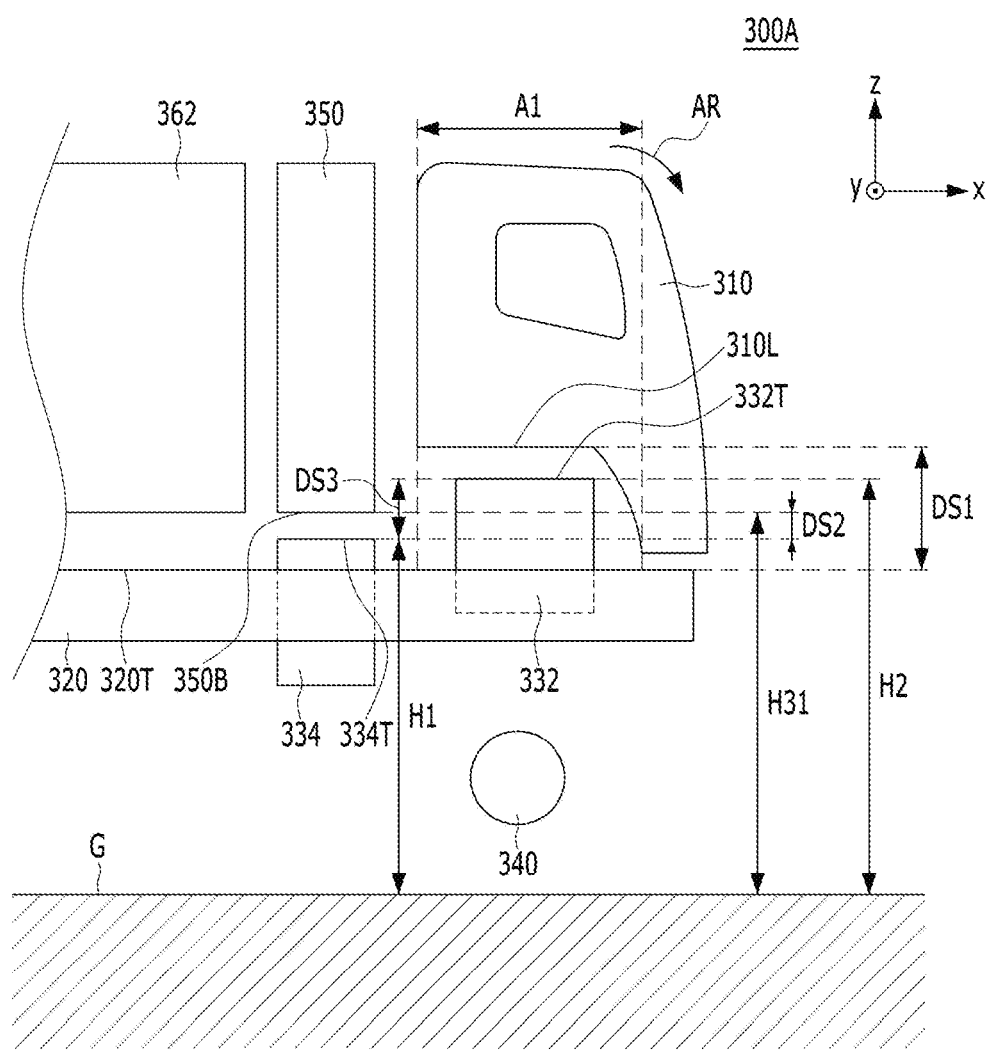
FIGS. 3A and 3B are cross-sectional views of the fuel cell vehicle according to the embodiment.
Figure 3B:
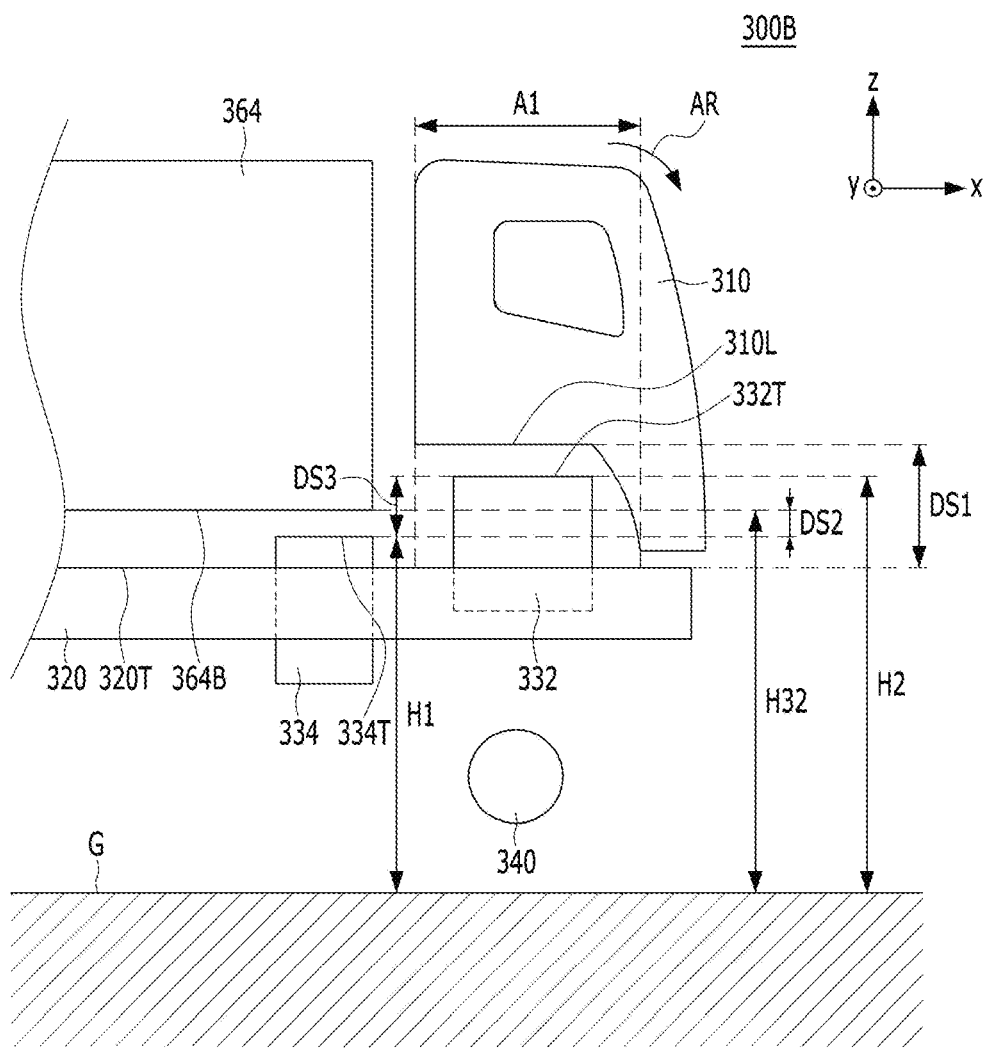

FIG. 1 is a perspective view showing the external appearance of the fuel cell vehicle 300 according to an embodiment, FIG. 2 is a plan view of the fuel cell vehicle 300 shown in FIG. 1, and FIGS. 3A and 3B are cross-sectional views of respective fuel cell vehicles 300A and 300B according to embodiments.

In order to promote an understanding of a vehicle body 320, illustrations of a front fuel cell (or, frontward fuel cell) 332 and a rear fuel cell (or, backward fuel cell) 334 are omitted from the fuel cell vehicle 300 shown in FIGS. 1 and 2.

Referring to FIGS. 1 to 3B, the fuel cell vehicle 300 (300A or 300B) according to the embodiment may include a vehicle body 320 and a plurality of fuel cells. For example, the plurality of fuel cells may include a front fuel cell 332 and a rear fuel cell 334. Although the plurality of fuel cells will be described below as including the front fuel cell 332 and the rear fuel cell 334, the following description may also be applied to the configuration in which three or more fuel cells are provided.

First, an example of each of the front fuel cell 332 and the rear fuel cell 334 included in the vehicle 300 (300A or 300B) according to the embodiment will now be described with reference to FIG. 4. However, the vehicle 300 (300A or 300B) according to the embodiment may include the front fuel cell 332 and the rear fuel cell 334 having any of various configurations other than the configuration shown in FIG. 4.

Figure 4:
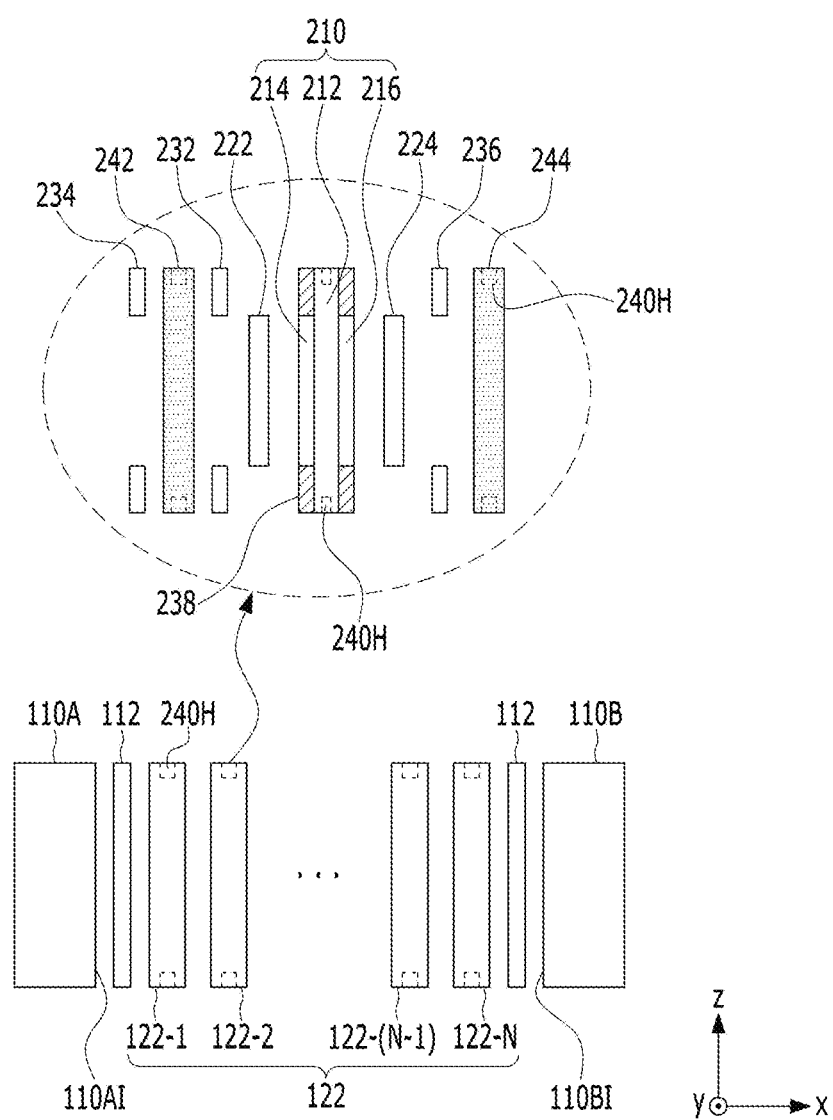
FIG. 4 is an exemplary cross-sectional view of each of a front fuel cell and a rear fuel cell included in the fuel cell vehicle according to the embodiment.

FIG. 4 is an exemplary cross-sectional view of each of the front fuel cell 332 and the rear fuel cell 334 included in the fuel cell vehicle 300 (300A or 300B) according to the embodiment. The term "fuel cell" to be mentioned herein with reference to FIG. 4 may indicate each of the front fuel cell 332 and the rear fuel cell 334 according to the embodiment.

The fuel cell may be, for example, a polymer electrolyte membrane fuel cell (or a proton exchange membrane fuel cell) (PEMFC), which has been studied most extensively as a power source for driving vehicles.

The fuel cell may include first and second end plates (pressing plates or compression plates) 110A and 110B, current collectors 112, and a cell stack 122.

The cell stack 122 may include a plurality of unit cells 122-1 to 122-N, which are stacked in the first direction. Here, "N" is a positive integer of 1 or greater, and may range from several tens to several hundreds. However, the disclosure is not limited to any specific value of "N".

Hereinafter, the cell stack 122 included in the front fuel cell 332 is referred to as a "first cell stack", and the cell stack 122 included in the rear fuel cell 334 is referred to as a "second cell stack".

Depending on embodiments, the number of unit cells included in the first cell stack and the number of unit cells included in the second cell stack may be the same as each other, or may be different from each other.

Each unit cell 122-$n$ (where 1 n N) may generate 0.6 volts to 1.0 volts of electricity, on average 0.7 volts of electricity. Thus, "N" may be determined in accordance with the intensity of the power to be supplied from the fuel cell to a load. Here, "load" may refer to a part of the vehicle 300 (300A or 300B) that requires power.

In particular, the vehicle 300 (300A or 300B) according to the embodiment may be a commercial vehicle, which requires a large amount of power, like a bus, a truck, or the like. In order to meet the requirements for a large amount of drive power, the vehicle 300 (300A or 300B) may include multiple (e.g. two) fuel cells, namely, the front fuel cell 332 and the rear fuel cell 334.

Each unit cell 122-$n$ may include a membrane electrode assembly (MEA) 210, gas diffusion layers (GDLs) 222 and 224, gaskets 232, 234 and 236, and separators (or bipolar plates) 242 and 244.

The membrane electrode assembly 210 has a structure in which catalyst electrode layers, in which electrochemical reaction occurs, are attached to both sides of an electrolyte membrane through which hydrogen ions move. Specifically, the membrane electrode assembly 210 may include a polymer electrolyte membrane (or a proton exchange membrane) 212, a fuel electrode (a hydrogen electrode or an anode) 214, and an air electrode (an oxygen electrode or a cathode) 216. In addition, the membrane electrode assembly 210 may further include a sub-gasket 238.

The polymer electrolyte membrane 212 is disposed between the fuel electrode 214 and the air electrode 216.

Hydrogen, which is the fuel in the fuel cell, may be supplied to the fuel electrode 214 through the first separator 242, and air containing oxygen as an oxidizer may be supplied to the air electrode 216 through the second separator 244.

The hydrogen supplied to the fuel electrode 214 is decomposed into hydrogen ions (protons) (H+) and electrons (e−) by the catalyst. Only the hydrogen ions may be selectively transferred to the air electrode 216 through the polymer electrolyte membrane 212, and at the same time, the electrons may be transferred to the air electrode 216 through the gas diffusion layers 222 and 224 and the first and second separators 242 and 244, which are conductors. In order to realize the above operation, a catalyst layer may be applied to each of the fuel electrode 214 and the air electrode 216. The movement of the electrons described above causes the electrons to flow through an external wire, thus generating current. That is, the fuel cell may generate power due to the electrochemical reaction between hydrogen, which is the fuel, and oxygen contained in the air.

In the air electrode 216, the hydrogen ions supplied through the polymer electrolyte membrane 212 and the electrons transferred through the first and second separators 242 and 244 meet oxygen in the air supplied to the air electrode 216, thus causing a reaction that generates water (hereinafter, referred to as "product water"). The product water generated in the air electrode 216 may penetrate the polymer electrolyte membrane 212 and may be transferred to the fuel electrode 214.

The first and second gas diffusion layers 222 and 224 serve to uniformly distribute hydrogen and oxygen, which are reactant gases, and to transfer the generated electric energy. To this end, the first and second gas diffusion layers 222 and 224 may be disposed on respective sides of the membrane electrode assembly 210. The first gas diffusion layer 222 may serve to diffuse and uniformly distribute hydrogen supplied as a reactant gas through the first separator 242, and may be electrically conductive. The second gas diffusion layer 224 may serve to diffuse and uniformly distribute air supplied as a reactant gas through the second separator 244, and may be electrically conductive.

The gaskets 232, 234 and 236 may serve to maintain the airtightness and clamping pressure of the cell stack at an appropriate level with respect to the reactant gases and the coolant, to disperse the stress when the first and second separators 242 and 244 are stacked, and to independently seal the flow paths. As such, since airtightness and watertightness are maintained by the gaskets 232, 234 and 236, the flatness of the surfaces that are adjacent to the cell stack 122, which generates power, may be secured, and thus surface pressure may be distributed uniformly over the reaction surfaces of the cell stack 122.

The first and second separators 242 and 244 may serve to move the reactant gases and the cooling medium and to separate each of the unit cells from the other unit cells. In addition, the first and second separators 242 and 244 may serve to structurally support the membrane electrode assembly 210 and the gas diffusion layers 222 and 224 and to collect the generated current and transfer the collected current to the current collectors 112.

The first and second separators 242 and 244 may be spaced apart from each other in the first direction and may be disposed outside the first and second gas diffusion layers 222 and 224, respectively. That is, the first separator 242 may be disposed on the left side of the first gas diffusion layer 222, and the second separator 244 may be disposed on the right side of the second gas diffusion layer 224.

The first separator 242 serves to supply hydrogen as a reactant gas to the fuel electrode 214 through the first gas diffusion layer 222. The second separator 244 serves to supply air as a reactant gas to the air electrode 216 through the second gas diffusion layer 224. In addition, each of the first and second separators 242 and 244 may form a channel through which the cooling medium (e.g. coolant) may flow.

Each of the first and second end plates 110A and 110B may be disposed at a respective one of both ends of the cell stack 122, and may support and fix the unit cells. That is, the first end plate 110A may be disposed at one end of the cell stack 122, and the second end plate 110B may be disposed at the opposite end of the cell stack 122.

The current collectors 112 may be disposed between the cell stack 122 and the inner surfaces 110AI and 110BI of the first and second end plates 110A and 110B that are opposite the cell stack 122. The current collectors 112 serve to collect the electric energy generated by the flow of electrons in the cell stack 122 and to supply the electric energy to a load of the vehicle 300 (300A or 300B) that uses the fuel cell.

Referring back to FIGS. 1 to 3B, the vehicle body 320 may include first and second body frames 322 and 324. Alternatively, the vehicle body 320 may further include at least one cross member 323.

The first and second body frames 322 and 324 may extend in the first direction (or forward direction or backward direction), in which the vehicle 300 (300A or 300B) travels (or heads), and may be opposite each other in the second direction, which intersects the first direction. In this case, the at least one cross member 323 may be a part that is disposed (or located) between the first body frame 322 and the second body frame 324 in the vehicle body 320, and may be integrally formed with at least one of the first body frame 322 or the second body frame 324. However, the vehicle 300 (300A or 300B) according to the embodiment is not limited as to the presence or absence of the cross member 323 or the specific position of the cross member 323.

The front fuel cell 332 may be mounted in a first space S1 in the vehicle 300 (300A or 300B), and the rear fuel cell 334 may be mounted in a second space S2 in the vehicle 300 (300A or 300B). Here, the first space S1 may be the space formed between the first body frame 322 and the second body frame 324, which are spaced apart from each other in the second direction in the vehicle 300 (300A or 300B).

The second space S2 may be the space that is located at the rear side of the first space S1, within the space formed between the first body frame 322 and the second body frame 324, which are spaced apart from each other in the second direction in the vehicle 300 (300A or 300B).

In addition, as shown in FIG. 3A, the vehicle 300 (300A) may include a cab (or a cabin room) 310, a loading part 362, and a hydrogen storage 350. Alternatively, as shown in FIG. 3B, the vehicle 300 (300B) may include a cab 310 and a loading part 364. The hydrogen storage 350 may be eliminated, or may be mounted at a position that is different from the position shown in FIG. 3A.

The loading part 362 or 364 may be located at the rear side of the cab 310 in the vehicle 300 (300A or 300B).

When the vehicle 300 (300A or 300B) is a commercial vehicle, which is a truck, the loading part 362 or 364 may provide a space in which cargo is loaded, and when the vehicle 300 (300A or 300B) is a bus, the loading part 362 or 364 may provide a space that passengers occupy.

Referring to FIGS. 3A and 3B, the loading parts 362 and 364 are illustrated as being of a closed type that has a rectangular-shaped cross-section, but the disclosure is not limited thereto. That is, according to another embodiment, unlike the configurations shown in FIGS. 3A and 3B, the loading parts 362 and 364 may have an open-type cross-section that has an open upper portion.

The hydrogen storage 350 may be located between the cab 310 and the loading part 362 in the first direction, and may store hydrogen required for the front fuel cell 332 and the rear fuel cell 334 as fuel of the vehicle 300 (300A or 300B). Although not shown, the vehicle 300A shown in FIG. 3A may further include pipes for respectively supplying hydrogen from the hydrogen storage 350 to the front fuel cell 332 and the rear fuel cell 334.

The cab 310 and the loading part 362 or 364 may be supported by the first and second body frames 322 and 324. The hydrogen storage 350 may also be supported by the first and second body frames 322 and 324.

In addition, the cross member 323 may serve to support at least one of the cab 310, the loading part 362 or 364, or the hydrogen storage 350. Alternatively, the cross member 323 may support none of the cab 310, the loading part 362 or 364, and the hydrogen storage 350, or may be omitted.

Referring back to FIG. 2, the first space S1 in which the front fuel cell 332 is mounted may be formed in the lower end of the cab 310 (or below the cab). When viewed in plan, the front fuel cell 332 is hidden by the cab 310 and thus is invisible. However, in order to promote an understanding of the embodiment, the first space S1 and the first and second body frames 322 and 324 are indicated by dotted lines in FIG. 2. The front fuel cell 332 may be mounted in the first space S1 located between the first body frame 322 and the second body frame 324 below the cab 310.

According to an embodiment, in the vehicle 300A shown in FIG. 3A, the second space S2 (S21) in which the rear fuel cell 334 is mounted (disposed, coupled, connected, located, or assembled) may be located below the hydrogen storage 350. In this case, the rear fuel cell 334 may be mounted in the second space S21 shown in FIG. 2, which is located between the first body frame 322 and the second body frame 324 within the space below the hydrogen storage 350.

According to another embodiment, in the vehicle 300B shown in FIG. 3B, the second space S2 (S22) in which the rear fuel cell 334 is mounted may be located below the loading part 364. In this case, the rear fuel cell 334 may be mounted at any position in the second space S22 between the first body frame 322 and the second body frame 324 below the loading part 364. For example, the rear fuel cell 334 may be mounted in the space S21, which is adjacent to the first space S1, within the second space S2.

In this case, in the vehicle 300 (300A or 300B), the second space in which the rear fuel cell 334 is mounted (disposed, coupled, connected, located, or assembled) may be determined within a range within which the rear fuel cell 334 does not interfere with a part (e.g. the cross member 323, a motor, or the like) mounted at the rear side of the rear fuel cell 334.

The front fuel cell 332 and the rear fuel cell 334 may be located at various positions relative to the ground G, the bottom surface 350B of the hydrogen storage 350, the top surfaces 320T of the first and second body frames 322 and 324, the bottom surface 364B of the loading pall 364, and the bottom surface 310L of the cab 310.

Hereinafter, various positions at which the front fuel cell 332 and the rear fuel cell 334 are mounted in the vehicle 300 (300A or 300B) according to the embodiment will be described with reference to the accompanying drawings.

In the vehicle 300 (300A or 300B) according to the embodiment, the top surface 334T of the rear fuel cell 334 may be lower than the top surface 332T of the front fuel cell 332 on the basis of the ground G. That is, a first height H1, by which the top surface 334T of the rear fuel cell 334 is spaced apart from the ground G, may be less than a second height H2, by which the top surface 332T of the front fuel cell 332 is spaced apart from the ground G.

In addition, when viewed in a cross-section, the top surface 332T of the front fuel cell 332 may be located between the top surface 320T of each of the first and second body frames 320 (322 and 324) and the bottom surface 310L of the cab 310. That is, when viewed in a cross-section, the top surface 332T of the front fuel cell 332 may be located in a space DS1 between the top surface 320T of each of the first and second body frames 320 (322 and 324) and the bottom surface 310L of the cab 310.

In addition, the vehicle 300 (300A or 300B) may further include a front axle 340. In this case, the front fuel cell 332 may be mounted between the cab 310 and the front axle 340.

According to an embodiment, as shown in FIG. 3A, the top surface 334T of the rear fuel cell 334 may be lower than the bottom surface 350B of the hydrogen storage 350 on the basis of the ground G. That is, the first height H1, by which the top surface 334T of the rear fuel cell 334 is spaced apart from the ground G, may be less than a third height H31 (hereinafter, referred to as a "3-1$^{st}$ height"), by which the bottom surface 350B of the hydrogen storage 350 is spaced apart from the ground G. In this case, a height difference DS2 between the first height H1 and the 3-1$^{st}$ height H31 may be greater than or equal to 0. When viewed in a cross-section, the more the height difference DS2 decreases, the more the length in the third direction of the space in the hydrogen storage 350, in which hydrogen is stored, may increase.

Further, a height difference DS3 between the top surface 332T of the front fuel cell 332 and the top surface 334T of the rear fuel cell 334 may be greater than the height difference DS2 between the top surface 334T of the rear fuel cell 334 and the bottom surface 350B of the hydrogen storage 350.

According to another embodiment, as shown in FIG. 3B, the top surface 334T of the rear fuel cell 334 may be lower than the bottom surface 364B of the loading part 364 on the basis of the ground G. That is, the first height H1, by which the top surface 334T of the rear fuel cell 334 is spaced apart from the ground G, may be less than a third height H32 (hereinafter, referred to as a "3-2$^{nd}$ height"), by which the bottom surface 364B of the loading part 364 is spaced apart from the ground G. In this case, a height difference DS2 between the first height H1 and the 3-2$^{nd}$ height H32 may be greater than or equal to 0. When viewed in a cross-section, the more the height difference DS2 decreases, the more the length in the third direction of the space in the loading part 364, in which cargo is loaded, may increase.

Further, a height difference DS3 between the top surface 332T of the front fuel cell 332 and the top surface 334T of the rear fuel cell 334 may be greater than the height difference DS2 between the top surface 334T of the rear fuel cell 334 and the bottom surface 364B of the loading part 364.

Figure 5:
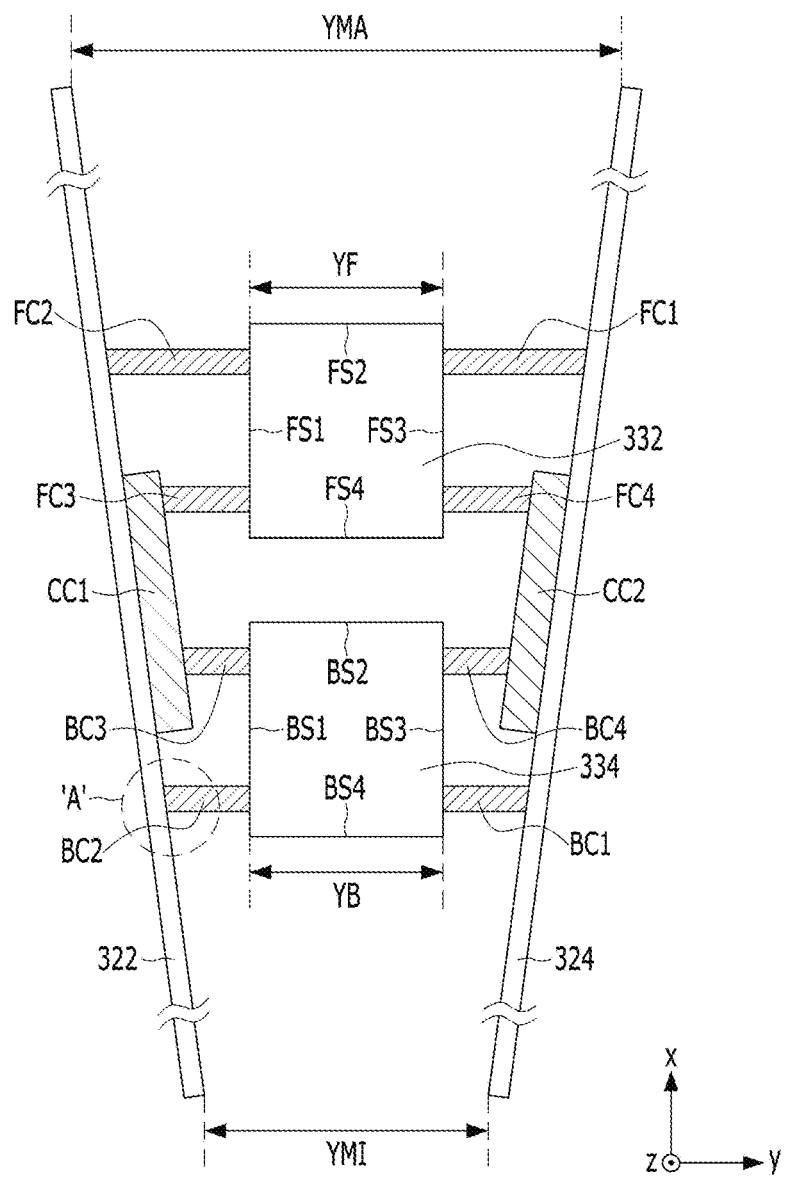
FIG. 5 is a plan view of the fuel cell vehicle according to the embodiment.

FIG. 5 is a plan view of the fuel cell vehicle 300 (300A or 300B) according to the embodiment.

FIG. 5 corresponds to a plan view of each of the vehicles 300A and 300B shown in FIGS. 3A and 3B. In order to promote an understanding of the structure in which each of the front fuel cell 332 and the rear fuel cell 334 is connected to the first and second body frames 322 and 324, illustration of the cab 310, the loading part 362 or 364, and the hydrogen storage 350, which are mounted (disposed, coupled, connected, located, or assembled) on the first and second body frames 322 and 324, is omitted from FIG. 5.

Referring to FIG. 5, the spacing distance in the second direction between the first body frame 322 and the second body frame 324 may gradually decrease from the front portion of the vehicle 300 (300A or 300B) to the rear portion thereof. The spacing distance in the second direction between the first body frame 322 and the second body frame 324 may be maximized at the front end of the vehicle 300 (300A or 300B), and may be minimized at the rear end of the vehicle 300 (300A or 300B). That is, the spacing distance in the second direction between the first body frame 322 and the second body frame 324 at the front end of the vehicle 300 (300A or 300B) may have the maximum value YMA, and the spacing distance in the second direction between the first body frame 322 and the second body frame 324 at the rear end of the vehicle 300 (300A or 300B) may have the minimum value YMI.

When viewed in plan, as described above, in the case in which the spacing distance in the second direction between the first body frame 322 and the second body frame 324 gradually decreases from the front portion of the vehicle 300 (300A or 300B) to the rear portion thereof, the width YF in the second direction of the front fuel cell 332 may be greater than the width YB in the second direction of the rear fuel cell 334. Alternatively, the width YF and the width YB may be the same as each other. The width YB in the second direction of the rear fuel cell 334 may be less than the minimum spacing distance YMI in the second direction between the first body frame 322 and the second body frame 324. Through this structure, even when the minimum spacing distance YMI in the second direction between the first body frame 322 and the second body frame 324 is small, the front fuel cell 332 and the rear fuel cell 334 are respectively mounted in the first space S1 and the second space S21 or S22 between the first body frame 322 and the second body frame 324.

The vehicle 300 (300A or 300B) according to the embodiment may further include a plurality of front connection members FC (e.g. FC1 to FC4) and a plurality of rear connection members BC (e.g. BC1 to BC4). Alternatively, the vehicle 300 (300A or 300B) according to the embodiment may further include a plurality of common connection members CC.

The front connection members FC serve to connect (couple, assemble, dispose, or displace) the front fuel cell 332 to the first and second body frames 322 and 324. For example, the front connection members FC may include first to fourth front connection members FC1 to FC4, which are located between the front fuel cell 332 and the first and second body frames 322 and 324. However, the disclosure is not limited as to the specific number of front connection members FC.

The rear connection members BC serve to connect (couple, assemble, dispose, or place) the rear fuel cell 334 to the first and second body frames 322 and 324. For example, the rear connection members BC may include first to fourth rear connection members BC1 to BC4, which are located between the rear fuel cell 334 and the first and second body frames 322 and 324. However, the disclosure is not limited as to the specific number of rear connection members BC.

Although each of the front fuel cell 332 and the rear fuel cell 334 is illustrated in FIG. 5 as having a rectangular-shaped plane, the disclosure is not limited thereto. Hereinafter, each of the front fuel cell 332 and the rear fuel cell 334 will be described as having a rectangular-shaped plane, as shown in FIG. 5. However, the following description may also be applied to the case in which each of the front fuel cell 332 and the rear fuel cell 334 has a polygonal-shaped, circular-shaped, or elliptical-shaped plane.

The front fuel cell 332 may include four sides, namely, first to fourth sides FS1, FS2, FS3 and FS4.

According to an embodiment, as shown in FIG. 5, each of the second and third front connection members FC2 and FC3 may be disposed between the first side FS1 of the front fuel cell 332 and the first body frame 322, and may connect the front fuel cell 332 to the first body frame 322. Each of the first and fourth front connection members FC1 and FC4 may be disposed between the third side FS3 of the front fuel cell 332 and the second body frame 324, and may connect the front fuel cell 332 to the second body frame 324.

According to another embodiment, unlike the configuration shown in FIG. 5, each of the second and third front connection members FC2 and FC3 may connect at least one of the second side FS2, the fourth side FS4, the corner between the first side FS1 and the second side FS2, or the corner between the first side FS1 and the fourth side FS4 of the front fuel cell 332, to the first body frame 322. In addition, unlike the configuration shown in FIG. 5, each of the first and fourth front connection members FC1 and FC4 may connect at least one of the second side FS2, the fourth side FS4, the corner between the second side FS2 and the third side FS3, or the corner between the third side FS3 and the fourth side FS4 of the front fuel cell 332, to the second body frame 324.

The rear fuel cell 334 may include four sides, namely first to fourth sides BS1, BS2, BS3 and BS4.

According to an embodiment, as shown in FIG. 5, each of the second and third rear connection members BC2 and BC3 may be disposed between the first side BS1 of the rear fuel cell 334 and the first body frame 322, and may connect the rear fuel cell 334 to the first body frame 322. Each of the first and fourth rear connection members BC1 and BC4 may be disposed between the third side BS3 of the rear fuel cell 334 and the second body frame 324, and may connect the rear fuel cell 334 to the second body frame 324.

According to another embodiment, unlike the configuration shown in FIG. 5, each of the second and third rear connection members BC2 and BC3 may connect at least one of the second side BS2, the fourth side BS4, the corner between the first side BS1 and the second side BS2, or the corner between the first side BS1 and the fourth side BS4 of the rear fuel cell 334, to the first body frame 322. In addition, unlike the configuration shown in FIG. 5, each of the first and fourth rear connection members BC1 and BC4 may connect at least one of the second side BS2, the fourth side BS4, the corner between the second side BS2 and the third side BS3, or the corner between the third side BS3 and the fourth side BS4 of the rear fuel cell 334, to the second body frame 324.

The common connection members CC serve to connect (couple, assemble, dispose, or place) some of the front connection members FC and some of the rear connection members BC to the first and second body frames 322 and 324. For example, the common connection members CC may include first and second common connection members CC1 and CC2, but the disclosure is not limited as to the specific number of common connection members CC.

Each of the common connection members CC serves to connect a corresponding one of the front connection members and a corresponding one of the rear connection members, which are adjacent to each other in the first direction, to a corresponding one of the first and second body frames 322 and 324. Specifically, the third front connection member FC3 among the front connection members FC and the third rear connection member BC3 among the rear connection members BC are adjacent to each other in the first direction. In addition, the fourth front connection member FC4 among the front connection members FC and the fourth rear connection member BC4 among the rear connection members BC are adjacent to each other in the first direction. The first common connection member CC1 serves to connect the third front connection member FC3 and the third rear connection member BC3 to the first body frame 322, and the second common connection member CC2 serves to connect the fourth front connection member FC4 and the fourth rear connection member BC4 to the second body frame 324.

In addition, the front connection members FC and the common connection members CC may connect the front fuel cell 332 to the first and second body frames 322 and 324 such that the front fuel cell 332 may be mounted (secured, coupled, connected, or assembled) above the first and second body frames 322 and 324 and may be demounted (dismantled, disassembled, or removed) above the first and second body frames 322 and 324.

Hereinafter, the method of mounting and demounting the front fuel cell 332 to and from the vehicle 300 (300A or 300B) using the front connection members FC will be described.

First, a method of mounting the front fuel cell 332 to the vehicle 300 (300A or 300B) will be described.

According to an embodiment, the cab 310 is tilted in the direction indicated by the arrow shown in FIGS. 3A and 3B. Thereafter, the first to fourth front connection members FC1 to FC4 are connected to the front fuel cell 332, and then the first and second front connection members FC1 and FC2 are connected to the first and second body frames 322 and 324 above the first and second body frames 322 and 324, and the third and fourth front connection members FC3 and FC4 are connected to the first and second common connection members CC1 and CC2, thereby completing the mounting of the front fuel cell 332.

According to another embodiment, the cab 310 is tilted in the direction indicated by the arrow shown in FIGS. 3A and 3B. Thereafter, the first and second front connection members FC1 and FC2 are connected to the first and second body frames 322 and 324 above the first and second body frames 322 and 324, and the third and fourth front connection members FC3 and FC4 are respectively connected to the first and second common connection members CC1 and CC2. Thereafter, the first to fourth front connection members FC1 to FC4 are connected to the front fuel cell 332, thereby completing the mounting of the front fuel cell 332.

Next, a method of demounting the front fuel cell 332 from the vehicle 300 (300A or 300B) will be described.

According to an embodiment, the cab 310 is tilted in the direction indicated by the arrow shown in FIGS. 3A and 3B. Thereafter, the first and second front connection members FC1 and FC2 are respectively separated from the first and second body frames 322 and 324 above the first and second body frames 322 and 324, and the third and fourth front connection members FC3 and FC4 are separated from the first and second common connection members CC1 and CC2. Thereafter, the separated components are withdrawn upwards from the first and second body frames 322 and 324. Thereafter, the first to fourth front connection members FC1 to FC4 are separated from the front fuel cell 332, thereby demounting the front fuel cell 332 from the vehicle 300 (300A or 300B).

According to another embodiment, the cab 310 is tilted in the direction indicated by the arrow shown in FIGS. 3A and 3B. Thereafter, the first to fourth front connection members FC1 to FC4 are separated from the front fuel cell 332. Thereafter, the separated front fuel cell 332 is withdrawn upwards from the first and second body frames 322 and 324. Thereafter, the first and second front connection members FC1 and FC2 are respectively separated from the first and second body frames 322 and 324 above the first and second body frames 322 and 324, and the third and fourth front connection members FC3 and FC4 are respectively separated from the first and second common connection members CC1 and CC2, thereby demounting the front fuel cell 332 from the vehicle 300 (300A or 300B).

As described above, in order to mount or demount the front fuel cell 332 to or from the vehicle 300 (300A or 300B), the front connection members FC may be disposed in a region A1 that is exposed after the cab 310 is tilted in the direction indicated by the arrow AR, as shown in FIGS. 3A and 3B. Accordingly, for example, when it is desired to perform maintenance/repair on the vehicle 300 (300A or 300B) equipped with the front fuel cell 332, it is possible to easily demount the front fuel cell 332 above the first and second body frames 322 and 324.

In addition, the rear connection members BC and the common connection members CC may connect the rear fuel cell 334 to the first and second body frames 322 and 324 such that the rear fuel cell 334 may be mounted above or below the first and second body frames 322 and 324 and may be demounted below the first and second body frames 322 and 324.

Hereinafter, a method of mounting and demounting the rear fuel cell 334 to and from the vehicle 300 (300A or 300B) using the rear connection members BC will be described.

First, a method of initially mounting the rear fuel cell 334 to the vehicle 300 (300A or 300B) will be described.

According to an embodiment, the first to fourth rear connection members BC1 to BC4 are connected to the rear fuel cell 334, and then the first and second rear connection members BC1 and BC2 are respectively connected to the first and second body frames 322 and 324 above or below the first and second body frames 322 and 324, and the third and fourth rear connection members BC3 and BC4 are respectively connected to the first and second common connection members CC1 and CC2, thereby completing the mounting of the rear fuel cell 334.

According to another embodiment, the first and second rear connection members BC1 and BC2 are respectively connected to the first and second body frames 322 and 324 above or below the first and second body frames 322 and 324, and the third and fourth rear connection members BC3 and BC4 are respectively connected to the first and second common connection members CC1 and CC2. Thereafter, the rear fuel cell 334 is connected to the first to fourth rear connection members BC1 to BC4, thereby completing the mounting of the rear fuel cell 334.

After the rear fuel cell 334 has been initially mounted to the vehicle 300 (300A or 300B) in the manner described above, the rear fuel cell 334 may be demounted from the vehicle 300 (300A or 300B) according to the method to be described below.

According to an embodiment, the first to fourth rear connection members BC1 to BC4 are separated from the rear fuel cell 334 below the first and second body frames 322 and 324, and the separated rear fuel cell 334 is withdrawn downwards from the first and second body frames 322 and 324. Thereafter, the first and second rear connection members BC1 and BC2 are respectively separated from the first and second body frames 322 and 324 below the first and second body frames 322 and 324, and the third and fourth rear connection members BC3 and BC4 are respectively separated from the first and second common connection members CC1 and CC2, thereby completing the demounting of the rear fuel cell 334.

According to another embodiment, the first and second rear connection members BC1 and BC2 are respectively separated from the first and second body frames 322 and 324 below the first and second body frames 322 and 324, and the third and fourth rear connection members BC3 and BC4 are respectively separated from the first and second common connection members CC1 and CC2. Thereafter, the first to fourth rear connection members BC1 to BC4 are separated from the rear fuel cell 334, thereby completing the demounting of the rear fuel cell 334.

Next, a method of again mounting the rear fuel cell 334, which has been demounted from the vehicle 300 (300A or 300B), to the vehicle 300 (300A or 300B) will be described below.

According to an embodiment, the first to fourth rear connection members BC1 to BC4 are connected to the rear fuel cell 334. Thereafter, the first and second rear connection members BC1 and BC2 are respectively connected to the first and second body frames 322 and 324 below the first and second body frames 322 and 324, and the third and fourth rear connection members BC3 and BC4 are respectively connected to the first and second common connection members CC1 and CC2, thereby completing the mounting of the rear fuel cell 334.

According to another embodiment, the first and second rear connection members BC1 and BC2 are respectively connected to the first and second body frames 322 and 324 below the first and second body frames 322 and 324, and the third and fourth rear connection members BC3 and BC4 are respectively connected to the first and second common connection members CC1 and CC2. Thereafter, the rear fuel cell 334 is connected to the first to fourth rear connection members BC1 to BC4 below the first and second body frames 322 and 324, thereby completing the mounting of the rear fuel cell 334.

As described above, according to the embodiment, after the rear fuel cell 334 has been initially mounted to the vehicle 300 (300A or 300B), the rear fuel cell 334 may be demounted from and again mounted to the vehicle 300 (300A or 300B) below the first and second body frames 322 and 324 in order to perform maintenance/repair or the like. Thus, it is not necessary to dismantle the hydrogen storage 350 shown in FIG. 3A or the loading part 364 shown in FIG. 3B from the vehicle 300 (300A or 300B) in order to mount or demount the rear fuel cell 334.

Further, as described above, the front fuel cell 332 may be mounted and demounted above the first and second body frames 322 and 324, whereas the rear fuel cell 334 may be mounted and demounted below the first and second body frames 322 and 324. That is, according to the embodiment, the direction in which the front fuel cell 332 is mounted and demounted and the direction in which the rear fuel cell 334 is mounted and demounted are different from each other. Therefore, it is required to prevent the connection state of the rear fuel cell 334 from being affected by the process of mounting or demounting the front fuel cell 332, and it is required to prevent the connection state of the front fuel cell 332 from being affected by the process of mounting or demounting the rear fuel cell 334. To this end, the third front connection member FC3 and the third rear connection member BC3, which are disposed adjacent to each other in the first direction, are not directly connected to the first body frame 322, but are indirectly connected to the first body frame 322 via the first common connection member CC1. Further, the fourth front connection member FC4 and the fourth rear connection member BC4, which are disposed adjacent to each other in the first direction, are not directly connected to the second body frame 324, but are indirectly connected to the second body frame 324 via the second common connection member CC2.

Hereinafter, examples of the front connection members FC, the rear connection members BC, and the common connection members CC will be described with reference to the accompanying drawings.

Figure 6:
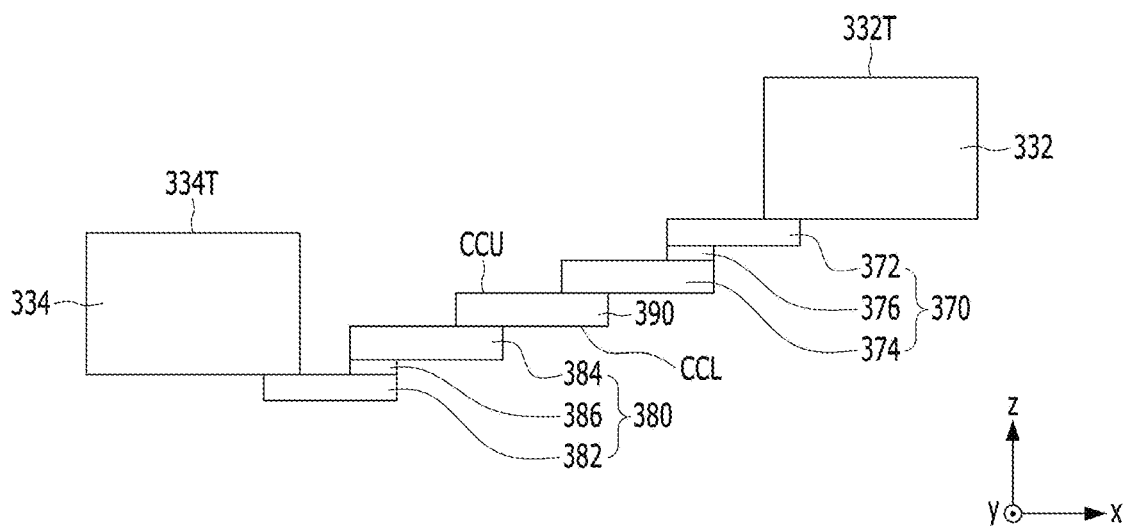
FIG. 6 is a partial side-sectional view of an example of the fuel cell vehicle shown in FIG. 5.

FIG. 6 is a partial side-sectional view of an example of the fuel cell vehicle 300 (300A or 300B) shown in FIG. 5.

FIG. 6 shows one of the front connection members FC, one of the rear connection members BC, and one of the common connection members CC.

As shown in FIG. 6, each 370 of the front connection members FC according to the embodiment may include a first mounting support bracket 372 and a first individual mounting bracket 374. The first mounting support bracket 372 is a portion of the front connection member 370 that is connected to an end of the front fuel cell 332.

The first individual mounting bracket 374 is a portion of the front connection member 370 that connects the first mounting support bracket 372 to one of the first body frame 322, the second body frame 324, the first common connection member CC1, and the second common connection member CC2.

When the front connection member 370 shown in FIG. 6 corresponds to the first and second front connection members FC1 and FC2 shown in FIG. 5, each of the first individual mounting brackets 374 of the first and second front connection members FC1 and FC2 may not be connected to the corresponding common connection member CC (390), but may be connected to a respective one of the first and second body frames 322 and 324, unlike the configuration shown in FIG. 6. However, when the front connection member 370 shown in FIG. 6 corresponds to the third and fourth front connection members FC3 and FC4 shown in FIG. 5, each of the first individual mounting brackets 374 of the third and fourth front connection members FC3 and FC4 may be connected to the corresponding common connection member CC (390), as shown in FIG. 6.

In addition, each 370 of the front connection members FC may further include a first mount insulator (or a bush) 376. The first mount insulator 376 may be connected to the front fuel cell 332 via the first mounting support bracket 372.

The first mount insulator 376 is disposed between the first mounting support bracket 372 and the first individual mounting bracket 374 in the third direction, and has vibration isolation capability. The first mount insulator 376 may prevent or minimize the transmission of vibrations from the first mounting support bracket 372 to the first individual mounting bracket 374, and may prevent or minimize the transmission of vibrations from the first individual mounting bracket 374 to the first mounting support bracket 372.

In addition, according to the embodiment, as shown in FIG. 6, each 380 of the rear connection members BC may include a second mounting support bracket 382 and a second individual mounting bracket 384. The second mounting support bracket 382 is a portion of the rear connection member 380 that is connected to an end of the rear fuel cell 334. The second individual mounting bracket 384 is a portion of the rear connection member 380 that connects the second mounting support bracket 382 to one of the first body frame 322, the second body frame 324, the first common connection member CC1, and the second common connection member CC2.

When the rear connection member 380 shown in FIG. 6 corresponds to each of the first and second rear connection members BC1 and BC2 shown in FIG. 5, each of the second individual mounting brackets 384 of the first and second rear connection members BC1 and BC2 may not be connected to the corresponding common connection member CC (390), but may be connected to a respective one of the first and second body frames 322 and 324, unlike the configuration shown in FIG. 6. However, when the rear connection member 380 shown in FIG. 6 corresponds to each of the third and fourth rear connection members BC3 and BC4 shown in FIG. 5, each of the second individual mounting brackets 384 of the third and fourth rear connection members BC3 and BC4 may be connected to the corresponding common connection member CC (390), as shown in FIG. 6.

In addition, each 380 of the rear connection members BC may further include a second mount insulator 386. The second mount insulator 386 may be connected to the rear fuel cell 334 via the second mounting support bracket 382.

The second mount insulator 386 is disposed between the second mounting support bracket 382 and the second individual mounting bracket 384 in the third direction, and has vibration isolation capability. The second mount insulator 386 may prevent or minimize the transmission of vibrations from the second mounting support bracket 382 to the second individual mounting bracket 384, and may prevent or minimize the transmission of vibrations from the second individual mounting bracket 384 to the second mounting support bracket 382.

In addition, each of the common connection members CC may include a common mounting bracket 390. The common mounting bracket 390 serves to connect the first individual mounting bracket 374 and the second individual mounting bracket 384, which are adjacent to each other in the first direction, to the first and second body frames 322 and 324.

For example, the common mounting bracket 390 shown in FIG. 6 may connect the first individual mounting bracket 374 of the third front connection member FC3 (370) and the second individual mounting bracket 384 of the third rear connection member BC3 (380), which are adjacent to each other in the first direction, to the first and second body frames 322 and 324.

In addition, the common mounting bracket 390 shown in FIG. 6 may connect the first individual mounting bracket 374 of the fourth front connection member FC4 (370) and the second individual mounting bracket 384 of the fourth rear connection member BC4 (380), which are adjacent to each other in the first direction, to the first and second body frames 322 and 324.

To this end, each of the common mounting brackets 390 of the first and second common connection members CC1 and CC2 may be directly connected to a respective one of the first and second body frames 322 and 324.

Referring to FIG. 6, the first individual mounting bracket 374 of the front connection member 370 may be connected to the upper portion (or the top surface) CCU of the common mounting bracket 390, and the second individual mounting bracket 384 of the rear connection member 380 may be connected to the lower portion (or the bottom surface) CCL of the common mounting bracket 390. This serves, as described above, to allow the front connection member 370 to be mounted or demounted above the first and second body frames 322 and 324 and to allow the rear connection member 380 to be mounted or demounted below the first and second body frames 322 and 324.

Figure 7:
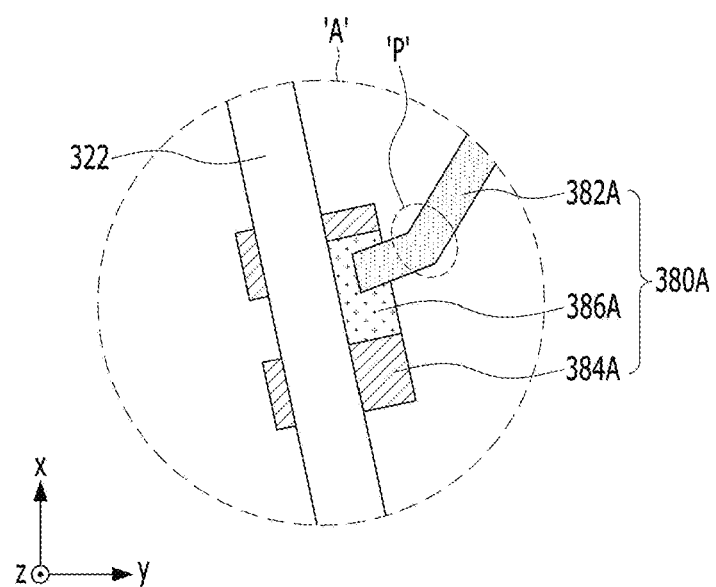
FIG. 7 is a plan view of an example of portion A shown in FIG. 5.

FIG. 7 is a plan view of an example of portion A shown in FIG. 5.

The second rear connection member BC2 shown in FIG. 5 may be connected to the first body frame 322, as shown in FIG. 7. Although not shown, the first rear connection member BC1 shown in FIG. 5 may be connected to the second body frame 324 in the manner shown in FIG. 7.

A second mounting support bracket 382A, a second individual mounting bracket 384A, and a second mounting insulator 386A shown in FIG. 7 correspond to the second mounting support bracket 382, the second individual mounting bracket 384, and the second mounting insulator 386 shown in FIG. 6, respectively.

As described above, in order to allow the rear connection member BC (380) to be mounted to or demounted from the vehicle 300 (300A or 300B) below the first and second body frames 322 and 324, as shown in FIG. 7, the second individual mounting bracket 384A may be connected while surrounding the first body frame 322, and may be separated from the first body frame 322 below the same.

In addition, as shown in FIG. 7, the second mounting support bracket 382A may include a bent portion P. Although not shown, the first mounting support bracket 372 may also include a bent portion P in the same manner as shown in FIG. 7. This serves to connect the front and rear fuel cells 332 and 334, which are respectively disposed in the first and second spaces S1 and S2 formed between the first and second body frames 322 and 324 spaced apart from each other in the second direction, to the first and second body frames 322 and 324, extending in the first direction. However, the disclosure is not limited thereto. None of the front and rear connection members FC and BC may include a bent portion P depending on the portions of the front and rear fuel cells 332 and 334 at which the front and rear connection members FC and BC are disposed or depending on the shapes of the front and rear connection members FC and BC.

Figure 8:
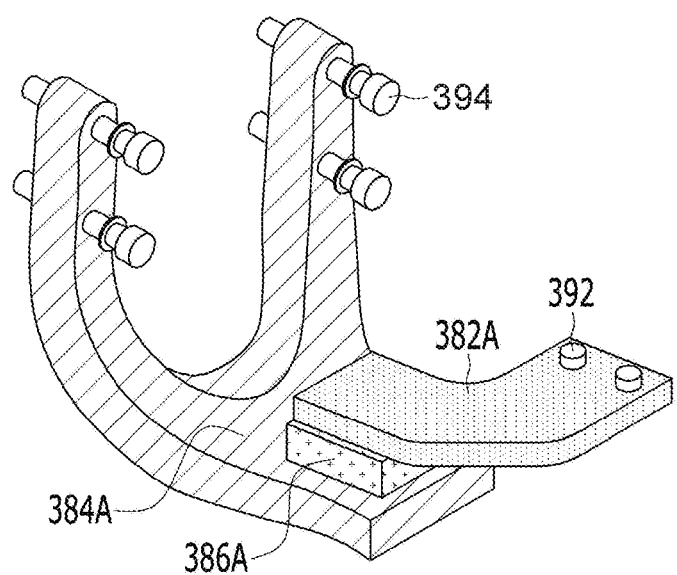
FIG. 8 is a perspective view of an example of the rear connection member shown in FIG. 7.

FIG. 8 is a perspective view of an example of the rear connection member 380A shown in FIG. 7.

Referring to FIG. 8, the second individual mounting bracket 384A of the rear connection member 380A may be coupled to the first body frame 322 using a screw 394. In addition, the second mounting support bracket 382A of the rear connection member 380A may be coupled to the rear fuel cell 334 using a screw 392.

Although not shown, the first mounting support bracket 372 of each of the first to fourth front connection members FC1 to FC4 may be screwed to the front fuel cell 332, and the first individual mounting bracket 374 thereof may be screwed to the first body frame 322, the second body frame 324, or the common mounting bracket 390. In addition, the second mounting support bracket 382 of each of the first, third and fourth rear connection members BC1, BC3 and BC4 may be screwed to the rear fuel cell 334, and the second individual mounting bracket 384 thereof may be screwed to the first body frame 322, the second body frame 324, or the common mounting bracket 390.

The fuel cell vehicle 300 (300A or 300B) according to the embodiment may correspond to a commercial vehicle such as a truck or a bus, which is heavier or larger than an automobile. Therefore, the fuel cell vehicle 300 (300A or 300B) according to the embodiment uses a plurality of fuel cells 332 and 334. The fuel cell vehicle 300 (300A or 300B) according to the embodiment may exhibit various effects through efficient arrangement of the fuel cells 332 and 334.

The fuel cells 332 and 334 are disposed in the fuel cell vehicle 300 (300A or 300B) according to the embodiment such that, when the fuel cells 332 and 334 are demounted from and again mounted to the vehicle in order to preform maintenance/repair, it is not necessary to dismantle other parts of the vehicle 300 (300A or 300B), thereby improving maintainability. In particular, when it is desired to perform maintenance/repair on the fuel cell vehicle 300 (300A or 300B) according to the embodiment, the rear fuel cell 334 may be removed or connected below the first and second body frames 322 and 324. Thus, when the rear fuel cell 334 is demounted from and again mounted to the vehicle 300 (300A or 300B), it is not necessary to dismantle the hydrogen storage 350 shown in FIG. 3A or the loading part 364 shown in FIG. 3B from the vehicle 300 (300A or 300B), thereby reducing the time and expense required for maintenance/repair of the fuel cells 332 and 334.

In addition, since the height difference DS2 in the cross-section shown in FIG. 3A is small, the length in the third direction of the space occupied by the hydrogen storage 350 may increase, and thus the amount of hydrogen that is capable of being loaded in the hydrogen storage 350 as fuel of the vehicle 300 (300A or 300B) may increase. The increase in the amount of hydrogen that is loaded as fuel of the vehicle 300 (300A or 300B) may increase the distance that the vehicle 300 (300A or 300B) is capable of traveling.

In addition, since the height difference DS2 in the cross-section shown in FIG. 3B is small, the length in the third direction of the space occupied by the loading part 364 may increase, and thus the amount of cargo that is capable of being loaded in the loading part 364 (or the number of passengers that are capable of getting on the vehicle when the vehicle is a bus) may increase.

In addition, in the fuel cell vehicle 300 (300A or 300B) according to the embodiment, the width YF in the second direction of the front fuel cell 332 and the width YB in the second direction of the rear fuel cell 334 may be adjusted so as not to affect the arrangement of parts (e.g. piping, wiring, etc.) around the front and rear fuel cells 332 and 334.

As is apparent from the above description, the embodiments provide a fuel cell vehicle in which a plurality of fuel cells is efficiently disposed, thereby improving the maintainability thereof, increasing the traveling distance thereof, and increasing the amount of cargo capable of being loaded therein or the number of passengers capable of riding therein.

The above-described various embodiments may be combined with each other without departing from the objects of the present disclosure unless they are contrary to each other. In addition, for any element that is not described in detail in any of the various embodiments, reference may be made to the description of an element having the same reference numeral in another embodiment.

While the present disclosure has been particularly shown and described with reference to exemplary embodiments thereof, these embodiments are only proposed for illustrative purposes and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:
1. A fuel cell vehicle, comprising:
a front fuel cell mounted in a first space;
a rear fuel cell mounted in a second space located at a rear side of the first space based on a first direction in which the fuel cell vehicle travels, the rear fuel cell comprising a top surface that is lower than a top surface of the front fuel cell relative to a ground;

first and second body frames extending in the first direction and being opposite each other in a second direction that intersects the first direction; and a cab, the front fuel cell being mounted to a lower end of the cab, wherein a space between the first body frame and the second body frame, spaced apart from each other in the second direction, comprises the first space and the second space, and wherein the front and rear fuel cells are mounted to the first and second body frames.

2. The fuel cell vehicle according to claim 1, further comprising:

a loading part located at a rear side of the cab, wherein the cab and the loading part are each supported by the first and second body frames.

3. The fuel cell vehicle according to claim 2, further comprising a hydrogen storage located between the cab and the loading part in the first direction.

4. The fuel cell vehicle according to claim 3, wherein the rear fuel cell is mounted below the hydrogen storage.

5. The fuel cell vehicle according to claim 4, wherein the top surface of the rear fuel cell is lower than a bottom surface of the hydrogen storage relative to the ground.

6. The fuel cell vehicle according to claim 4, wherein a height difference between the top surface of the front fuel cell and the top surface of the rear fuel cell is greater than a height difference between the top surface of the rear fuel cell and a bottom surface of the hydrogen storage.

7. The fuel cell vehicle according to claim 2, further comprising a front axle, wherein the front fuel cell is disposed between the cab and the front axle.

8. The fuel cell vehicle according to claim 2, wherein the top surface of the front fuel cell is located between a top surface of each of the first and second body frames and a bottom surface of the cab.

9. The fuel cell vehicle according to claim 2, wherein the rear fuel cell is mounted below the loading part.

10. The fuel cell vehicle according to claim 9, wherein the top surface of the rear fuel cell is lower than a bottom surface of the loading part on relative to the ground.

11. The fuel cell vehicle according to claim 9, wherein a height difference between the top surface of the front fuel cell and the top surface of the rear fuel cell is greater than a height difference between the top surface of the rear fuel cell and a bottom surface of the loading part.

12. The fuel cell vehicle according to claim 2, wherein a spacing distance in the second direction between the first body frame and the second body frame gradually decreases from a front portion of the fuel cell vehicle to a rear portion of the fuel cell vehicle based on the direction in which the fuel cell vehicle travels.

13. The fuel cell vehicle according to claim 12, wherein a width in the second direction of the front fuel cell is greater than a width in the second direction of the rear fuel cell; and wherein the width in the second direction of the rear fuel cell is less than a minimum spacing distance in the second direction between the first body frame and the second body frame.

14. The fuel cell vehicle according to claim 2, further comprising:

a plurality of front connection members configured to connect the front fuel cell to the first and second body frames; and a plurality of rear connection members configured to connect the rear fuel cell to the first and second body frames.

15. The fuel cell vehicle according to claim 14, further comprising a plurality of common connection members configured to connect some of the plurality of front connection members and some of the plurality of rear connection members to the first and second body frames.

16. The fuel cell vehicle according to claim 15, wherein each of the plurality of front connection members comprises:

a first mounting support bracket connected to an end of the front fuel cell; and a first individual mounting bracket configured to connect the first mounting support bracket to one of the first and second body frames.

17. The fuel cell vehicle according to claim 16, wherein each of the plurality of rear connection members comprises:

a second mounting support bracket connected to an end of the rear fuel cell; and a second individual mounting bracket configured to connect the second mounting support bracket to one of the first and second body frames.

18. The fuel cell vehicle according to claim 17, wherein each of the plurality of common connection members comprises a common mounting bracket configured to connect the first individual mounting bracket and the second individual mounting bracket, adjacent to the first individual mounting bracket in the first direction, to the first and second body frames.

19. The fuel cell vehicle according to claim 18, wherein the first individual mounting bracket is connected to an upper portion of the common mounting bracket, and wherein the second individual mounting bracket is connected to a lower portion of the common mounting bracket.

20. A fuel cell vehicle, comprising:

a front fuel cell mounted in a first space;

a rear fuel cell mounted in a second space located at a rear side of the first space based on a first direction in which the fuel cell vehicle travels, the rear fuel cell comprising a top surface that is lower than a top surface of the front fuel cell relative a ground;

left and right body frames extending continuously longitudinally in the first direction, wherein the first space and second space are between the left body frame and the right body frame, and the front fuel cell and the rear fuel cell are each mounted to both the left body frame and to the right body frame; and a cab, the front fuel cell being mounted to a lower end of the cab.

* * * * *